United States Patent [19]

Leonov

[11] Patent Number: 5,048,195
[45] Date of Patent: Sep. 17, 1991

[54] APPARATUS AND METHOD FOR ALIGNMENT OF ADJACENT SURFACES

[75] Inventor: Mark A. Leonov, Santa Clara, Calif.

[73] Assignee: Intel Corporation, Santa Clara, Calif.

[21] Appl. No.: 563,560

[22] Filed: Aug. 6, 1990

[51] Int. Cl.$^5$ ............................ G01B 5/24; G01B 3/28
[52] U.S. Cl. ..................................... 33/645; 33/533; 33/557; 33/613
[58] Field of Search ................ 33/533, 645, 379, 567, 33/567.1, 568, DIG. 18, 501, 613, 557, 560

[56] References Cited

U.S. PATENT DOCUMENTS

| 3,533,167 | 10/1970 | Thompson et al. | 33/379 |
| 4,150,490 | 4/1979 | Sluke | 33/613 |
| 4,392,641 | 7/1983 | Dearman | 33/613 |
| 4,586,264 | 5/1986 | Zatezalo | 33/645 |
| 4,693,012 | 9/1987 | Cesna | 33/533 |
| 4,955,142 | 9/1990 | Rieck | 33/613 |

FOREIGN PATENT DOCUMENTS 2222677 3/1990 United Kingdom ................ 33/379

Primary Examiner—William A. Cuchlinski, Jr.
Assistant Examiner—Alvin Wirthlin
Attorney, Agent, or Firm—Blakely, Sokoloff, Taylor & Zafman

[57] ABSTRACT

An apparatus for aligning adjacent surfaces for coplanarity and angle is described. The apparatus comprises a base plate, a plurality of support legs coupled to the base plate, a plurality of depth gauges coupled to the base plate, an angle coupled to the base plate, and leveling means coupled to an inclined surface. The inclined surface of the angle plate slopes towards the plurality of depth gauges. The inclined surface has a predetermined angle. A method for aligning first and second adjacent surfaces for coplanarity and relative angle is also described. The alignment apparatus is placed on a flat surface. The apparatus is calibrated so that all of the plurality of depth gauges read a first value. The apparatus is placed on the first and second adjacent process modules such that the support legs rest on the first adjacent process module and the plurality of depth gauges rest on the second adjacent process module. The first and second process modules are aligned such that the plurality of depth gauges read the first value. The first and second process modules are aligned until the leveling means indicates level.

8 Claims, 2 Drawing Sheets

U.S. Patent     Sep. 17, 1991     Sheet 1 of 2     5,048,195
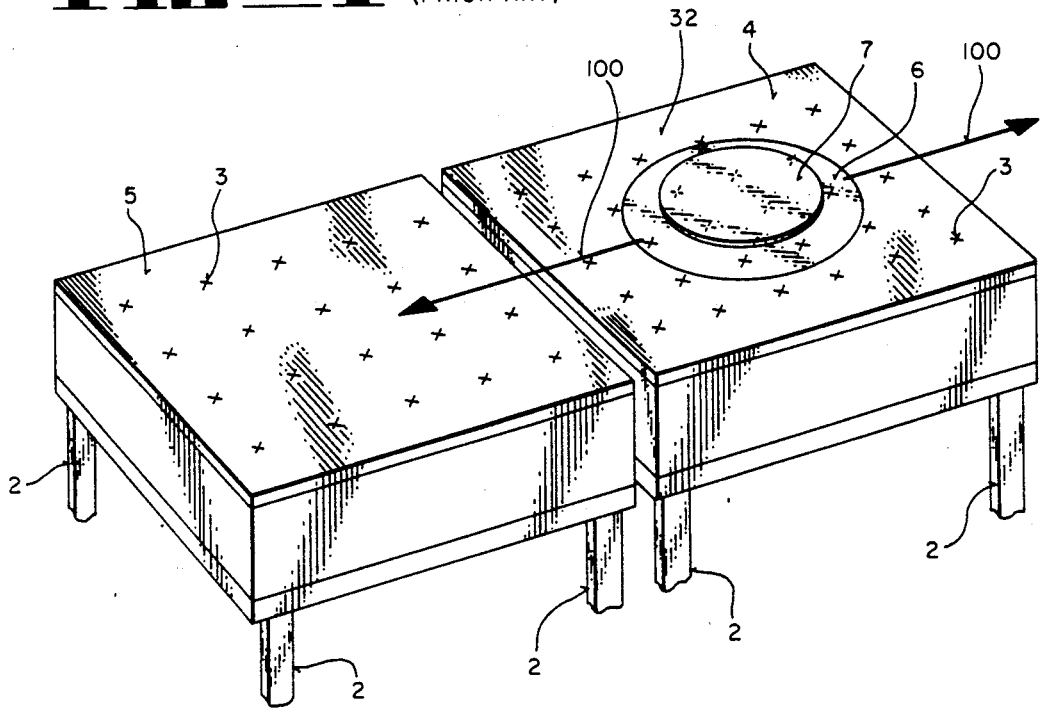
FIG_1 (PRIOR ART)
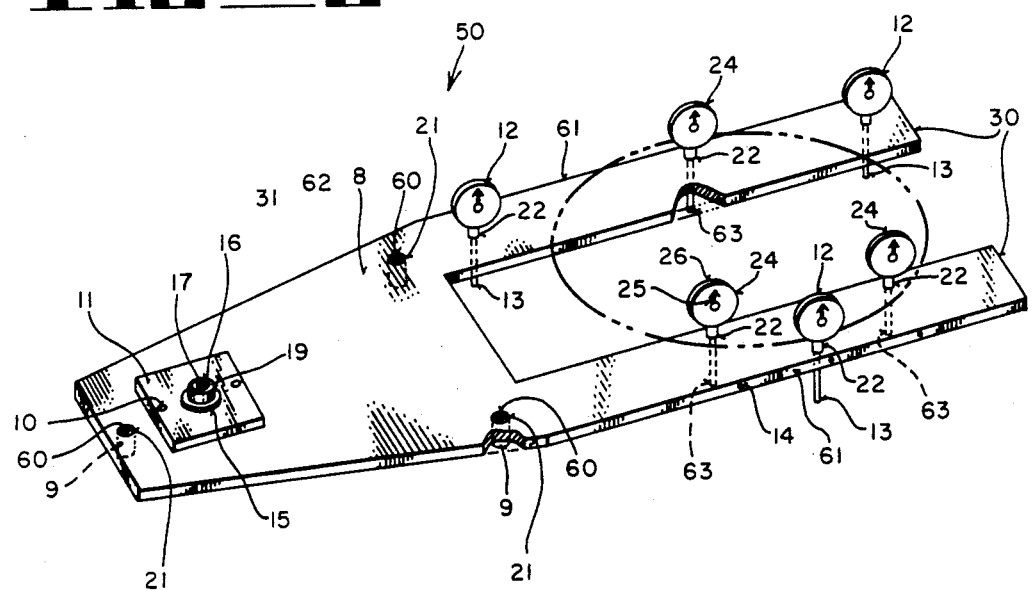
FIG_2

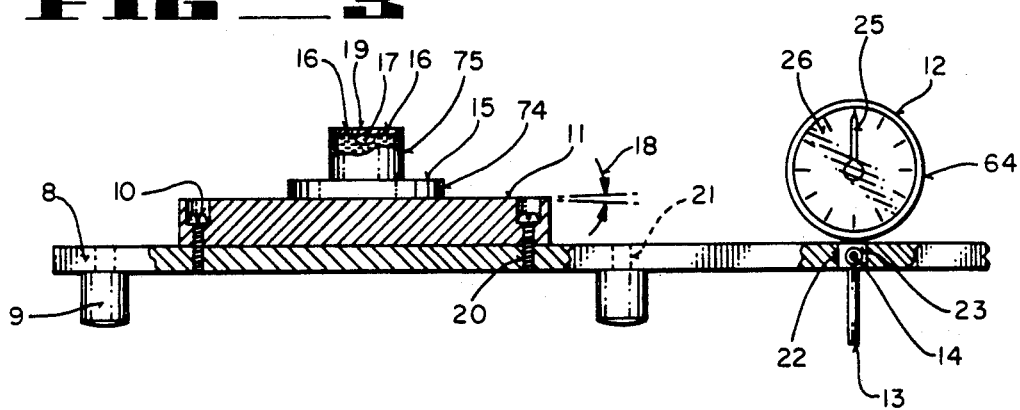
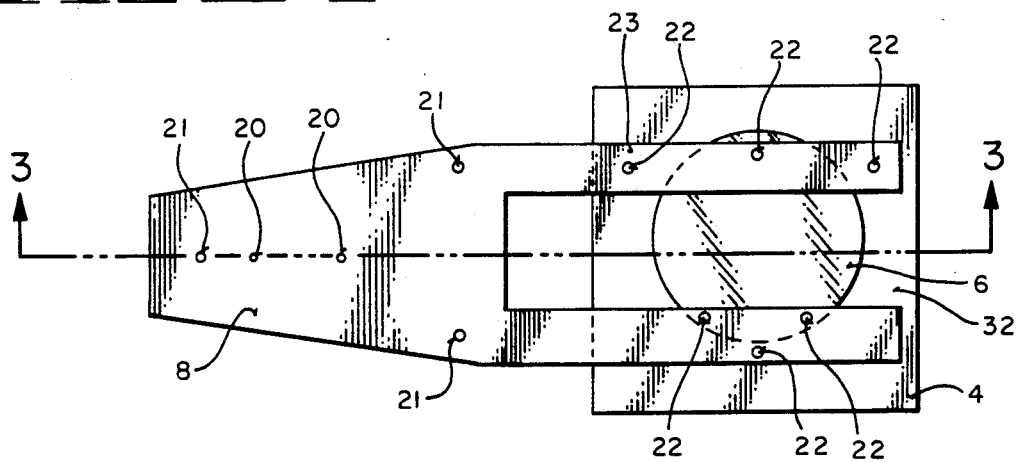
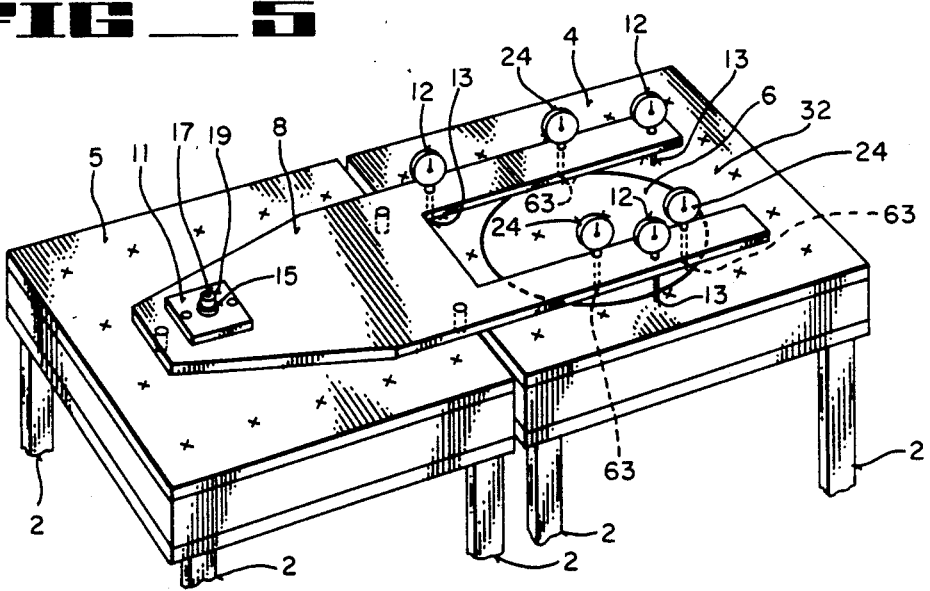

5,048,195

APPARATUS AND METHOD FOR ALIGNMENT OF ADJACENT SURFACES

FIELD OF THE INVENTION

The invention relates to the field of processing. More particularly, the invention pertains to the adjustment of the angle and level of equipment surfaces, including those of semiconductor manufacturing equipment.

BACKGROUND OF THE INVENTION

In semiconductor manufacturing, process modules provide a surface for semiconductor wafer processing. Generally, there are two types of process modules: hot process modules and cold process modules. FIG. 1 illustrates hot process module 4 and cold process module 5. Hot process module 4 is used for heating wafer 7 while in an oven, and cold process module 5 is used for cooling wafer 7. A circular heating plate 6 resides in the center of hot process module 4. The plate radiates heat to maintain the temperature of wafer 7.

Processing a semiconductor wafer requires moving the wafer from one module to the next with as little physical contact as possible. Air flowing through perforations 3 in the process modules helps to keep wafer 7 from touching each process module surface. In addition, the two modules 4 and 5 are situated at a predetermined angle such that wafer 7 will be transferred from one module to the other at a given rate with minimal physical contact. This is called gravity wafer transport.

Gravity transport requires that the surfaces of the modules be aligned to reside in the same plane at all times. This alignment done during installation and periodically thereafter. Under one prior method of aligning process modules, a time-consuming trial and error approach is used to adjust the alignment of the two process modules so that they (1) are situated at a specific angle and (2) lie in the same plane. This prior method for adjusting the level and angle of process modules is discussed with reference to FIG. 1. Hot process module 4 is shown situated adjacent to cold process module 5. Test wafer 7 (supported by air flowing through air passages 3) is slid back and forth in directions 100 across process modules 4 and 5 while the process equipment is not operating. The level of modules 4 and 5 is adjusted using legs 2 until the modules are coplanar and at the proper transport angle. Generally, the angle of the two modules should be approximately one degree sloping from module 4 towards module 5. The angle is changed manually by eye by adjusting thumbscrews (or other leveling means) on legs 2 of modules 4 and 5.

If the modules are not coplanar, wafer 7 does not slide smoothly from one module to the adjacent module. When the wafer is slid back and forth in directions 100 and modules 4 and 5 are not coplanar, an audible "clicking" noise is generated. Legs 2 on modules 4 and 5 are adjusted by an operator until no "clicking" sound is heard. This helps to ensure that the two modules are coplanar. Coplanarity between the two modules allows the wafer to slide smoothly from one module to the next, thereby minimizing the likelihood of damage to the wafer.

Although this method of the prior art is generally effective, it is time-consuming and there is a relatively high likelihood of inaccurate adjustment. Improper alignment can result in damaged wafers as well as excessive equipment downtime for removal of particulates resulting from misaligned process modules. Particulates on process modules, damaged wafers, and excessive equipment down time all reduce wafer production.

SUMMARY AND OBJECTS OF THE INVENTION

One object of the present invention is to provide an apparatus that allows an operator to precisely align adjacent process modules so that they substantially reside in the same plane.

Another object of the present invention is to allow a precise adjustment of the angle of adjacent process modules.

An apparatus for aligning adjacent surfaces for coplanarity and angle is described. The apparatus comprises a base plate, a plurality of support legs coupled to the base plate, a plurality of depth gauges coupled to the base plate, an angle plate coupled to the base plate, and a leveling means coupled to an inclined surface of the angle plate. The inclined surface of the angle plate slopes towards the plurality of depth gauges. The inclined surface has a predetermined angle.

A method for aligning first and second adjacent surfaces for coplanarity and relative angle is also described. An alignment apparatus is placed on a flat surface. The alignment apparatus comprises (1) a base plate, (2) a plurality of support legs coupled to the base plate, (3) a plurality of depth gauges coupled to the base plate, (4) an angle plate coupled to the base plate, and (5) leveling means coupled to the inclined surface. The inclined surface of the angle plate slopes towards the plurality of depth gauges. The inclined surface has a predetermined angle. The apparatus is calibrated so that all of the plurality of depth gauges read a first value. The apparatus is placed on the first and second adjacent process modules such that the support legs rest on the first adjacent process module and the plurality of depth gauges rest on the second adjacent process module. The first and second process modules are aligned such that the plurality of depth gauges read the first value. The first and second process modules are aligned until the leveling means indicates level.

Other objects, features, and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings in which like references indicate similar elements and in which:

FIG. 1 shows prior art process modules.
FIG. 2 is a perspective view of the leveling tool.
FIG. 3 is a cutaway side view of the leveling tool.
FIG. 4 is a top view of the flat base plate of the leveling tool resting on a hot process module.
FIG. 5 shows the leveling tool installed on the process modules.

DETAILED DESCRIPTION

FIG. 2 shows leveling tool 50 for aligning the angle and coplanarity of adjacent process modules. Leveling tool 50 comprises base plate 8 that is supported by three support legs 9 and six depth gauge tips 13 and 63. Although leveling tool 50 is especially designed for alignment of semiconductor process modules, alternative embodiments of the leveling tool could be used for surface leveling in the aviation, automobile, or other industries.

In a preferred embodiment, base plate 8 of leveling tool 50 is approximately 17 inches long. Base plate 8 lies above both process modules 4 and 5 when an adjustment operation takes place. Base plate 8 is also approximately 6 inches wide and approximately ½ inch thick. Base plate 8 is manufactured of aluminum. In alternative embodiments, other materials may be used, however.

Depth gauges 12 and 24 are inserted through orifices 22 in arms 30 of base plate 8. Support legs 9 are attached to base plate 8 with screws 60 inserted into orifices 21. Although one preferred embodiment has three support legs and six depth gauges, alternative embodiments could employ greater or fewer support legs and depth gauges.

The depth gauges 12 and 24 shown in FIG. 2 and FIG. 3 have dial indicators 26 and are fixed to the flat base plate 8 using screws 14 inserted from the sides 61 of arms 30 through holes 23. Depth gauges 12 and 24 are spring loaded. When a depth gauge tip 13 or 63 is placed against a surface, the tip retracts to compress a spring. The deflection is translated to movement of arrow 25 on dial indicator 26 shown in FIGS. 2 and 3, which indicates the relative movement of the tip. Depth gauges 12 and 24 are such that when the same amount of pressure is placed on each gauge, the same reading will be indicated by the corresponding dial indicator 26. In alternative embodiments, other types of depth gauges, including those with digital displays, may be used.

In one preferred embodiment, depth gauges 12 and 24 shown in FIG. 2 are positioned at predetermined locations for contact with the hot process module 4. Gauges 24 are arranged so that when leveling tool 50 is placed on top of process modules 4 and 5, gauge tips 63 lie on plate 6 of hot process module 4. Tips 13 of gauges 12 lie on the remaining portion 32 of hot process module 4.

As shown in FIG. 3, angle plate 11 is attached to base plate 8 using screws 10. Screws 10 couple angle plate 11 to the flat base plate 8 through threaded orifices 20. Angle plate 11 is comprised of aluminum and slopes at an angle 18. In one preferred embodiment, angle 18 is approximately one degree. In alternative embodiments, angle 18 may have other values.

As shown in FIGS. 2 and 3, bubble level 15 is fixed at a central location on angle plate 11. In one preferred embodiment, angle plate 11 is mounted on end 31 of base plate 8, opposite from arms 30.

Bubble level 15 is comprised of plastic and includes base 74 and liquid container 75. Liquid container 75 includes window 19 and bubble 17. As shown in FIG. 2, bubble 17 can be viewed through window 19. Window 19 has an indicator ring 16. In order to determine the level of base plate 8, bubble 17 is centered with respect to indicator ring 16. Because angle plate 11 is machined at a one degree angle and mounted such that it slopes towards arms 30, when bubble level 15 is set such that it indicates level (namely, when bubble 17 lies within indicator ring 16), leveling tool 50 will slope at an angle of approximately one degree away from arms 30.

With reference to FIG. 5, the alignment of adjacent process modules 4 and 5 using leveling tool 50 is described. First, leveling tool 50 is placed on a precision flat surface for calibration. The precision flat surface is not shown. The flat surface should be comprised of a fairly rigid material and be manufactured precisely flat. While resting on the flat calibration surface, depth gauges 12 and 24 are calibrated by rotating rings 64 (shown in FIG. 3) on each gauge such that each depth gauge arrow 25 points to zero (or, alternatively, to another predetermined value). This indicates that the same amount of pressure is being applied to all of depth gauges 12 and 24 for the calibration surface and that base plate 8 and arms 30 are coplanar. Note that tips 13 and 63 of depth gauges 12 and 24 must extend beyond the respective length of each leg 9 in order to contact the surface. Contact with depth gauge tips 13 and 63 is necessary to get a reading on depth gauges 12 and 24.

After calibration, leveling tool 50 is placed on the adjacent process modules 4 and 5 in a manner as shown in FIG. 5. Support legs 9 should all be positioned on cold process module 5 only. Arms 30 that include depth gauges 12 and 24 are positioned on hot process module 4. Arms 30 are positioned so that tips 63 of depth gauges 24 rest on hot plate 6 of process module 4. The remaining depth gauge tips 13 are positioned so that they rest on the remaining portion 32 of hot process module 4.

Process modules 4 and 5 are then aligned such that depth gauges 12 and 24 all read zero (or, alternatively, another value if that other value was used for calibration). The process modules are adjusted via legs 2 of process modules 4 and 5. Legs 2 of process modules 4 and 5 include means for independently adjusting the height of the modules. In one embodiment, legs 2 are thumbscrews. Alternatively, legs 2 can include other similar adjustment means.

As part of the alignment process, hot plate 6 is then adjusted with respect to the remaining surface portion 32 of process module 4. Hot plate 6 also has a means for adjusting its height relative to the remaining surface portion 32 of module 4.

When legs 2 and plate 6 have been adjusted in height such that all depth gauges read zero (or alternatively, another value if that other value was used for calibration), process modules 4 and 5 are coplanar.

Process modules 4 and 5 are then adjusted via legs 2 such that bubble 17 of bubble level 15 is centered with respect to alignment ring 16. The calibrated readings on depth gauges 12 and 24 must be maintained, however, while centering bubble 17.

When this has been done, the result should be that the two process modules reside in approximately the same plane. In addition, the result should be that module 4 slopes approximately one degree towards module 5. This slope facilitates wafer transport. Leveling tool 50 is then removed, and manufacturing may begin or resume.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus for aligning adjacent surfaces for coplanarity and angle comprising:
   (A) a base plate;
   (B) a plurality of support legs coupled to the base plate;
   (C) a plurality of depth gauges coupled to the base plate;
   (D) an angle plate coupled to the base plate, wherein the angle plate has an inclined surface that slopes towards the plurality of depth gauges, and wherein the inclined surface has a predetermined angle; and (E) leveling means coupled to the inclined surface.

2. The apparatus of claim 1, wherein each of the plurality of depth gauges has a dial indicator.

3. The apparatus of claim 1, wherein the predetermined angle of the inclined surface is approximately one degree.

4. The apparatus of claim 1, wherein the leveling device comprises a bubble level.

5. The apparatus of claim 1, wherein the base plate comprises a platform area and two arms, wherein the two arms are coplanar and extend from the platform area, and wherein the two arms are affixed to a first end of the platform.

6. The apparatus of claim 5, wherein the plurality of support legs are coupled to the platform, and wherein the plurality of depth gauges are coupled to the two arms.

7. The apparatus of claim 6, wherein the angle plate is coupled at a second end of the platform of the base plate.

8. A method for aligning first and second adjacent process modules for coplanarity and relative angle, comprising the steps of:

(A) placing an alignment apparatus on a flat surface, wherein the alignment apparatus comprises (1) a base plate; (2) a plurality of support legs coupled to the base plate; (3) a plurality of depth gauges coupled to the base plate; (4) an angle plate coupled to the base plate, wherein the angle plate has an inclined surface that slopes towards the plurality of depth gauges, and wherein the inclined surface has a predetermined angle; and (5) leveling means coupled to the inclined surface;

(B) calibrating the apparatus so that all of the plurality of depth gauges read a first value;

(C) placing the apparatus on the first and second adjacent process modules such that the support legs rest on the first adjacent process module and the plurality of depth gauges rest on the second adjacent process module;

(D) aligning the first and second process modules such that the plurality of depth gauges read the first value; and (E) aligning the first and second process modules until the leveling means indicates level.

* * * * *